May 24, 1966  C. B. VINCENT  3,252,834
PRESERVATIVE TREATMENT OF ELECTRIC CABLE
Filed April 11, 1962  2 Sheets-Sheet 1

INVENTOR.
Clifford B. Vincent
BY
*Flehr and Swain*
ATTORNEYS.

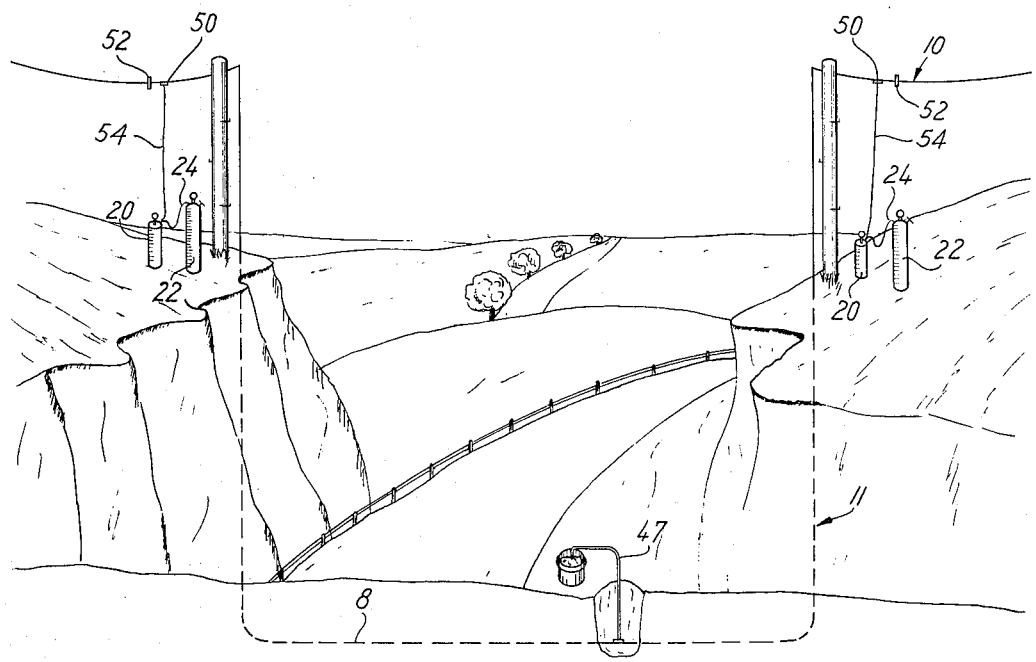
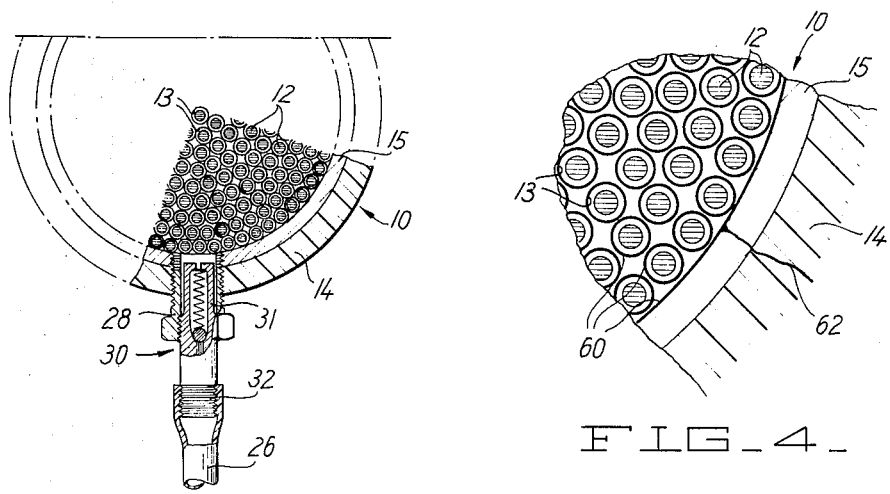

United States Patent Office 3,252,834
Patented May 24, 1966

3,252,834
PRESERVATIVE TREATMENT OF ELECTRIC CABLE
Clifford B. Vincent, Glen Ellen, Calif., assignor to Vincent & Vincent, Inc., Windsor, Calif., a corporation of California
Filed Apr. 11, 1962, Ser. No. 186,712
3 Claims. (Cl. 117—231)

This invention relates generally to the treatment of electrical cables, and particularly to the introduction of treating compositions into electrical cable to protect against penetration by moisture and to otherwise prolong the useful life of the cable.

Electrical cables customarily comprise one or more conductors surrounded by an insulating medium, and a protective sheath. Such cables are used for the transmitting of electric power and in the transmission of communications. Power cables have relatively few conductors of heavy gauge which are insulated for high voltages. Communications cables usually contain many pairs of small gauge, paper insulated copper conductors, surrounded by an external lead or plastic sheath. The various pairs of conductors are arranged by twisting and placing to minimize pick-up (i.e., cross talk) between them. The co-axial cable is a special type in which a pair of conductors is formed by a center wire and the outer sheath. Electrical cables may be strung overhead or underground, the co-axial being universally underground.

Although many problems are encountered in the use and maintenance of electrical cables, the most significant is moisture penetration. The problem is particularly acute in overhead communications cables, which are particularly subject to adverse weather conditions, such as rain storms, sleet, and fog. Moisture penetration can occur through tiny cracks and openings caused by thermal expansion and contraction, chafing by tree limbs, wind action, attack by tiny boring insects, electrolytic action (particularly underground), and so on. At junctures between underground and overhead lines, as in FIGURE 2, moisture seeping into the line at relatively low underground temperatures (e.g., 45° F.) will frequently evaporate at the higher temperatures encountered at ground or sidewalk levels (e.g., as high as 160° F.) and thereafter condense in the overhead line due to atmospheric cooling (e.g., at 90° F.), causing entire sections of the line to become permeated. When the accumulation of moisture is substantial, the water inevitably collects at low points in the cables, represented at 8 in FIGURES 1 and 2. Moisture accumulations of this sort impose a serious burden on the telephone repairmen, particularly with communications cable insulated with dry or untreated paper, because even the slightest amount of moisture will reduce the insulation value of the paper to a very low point, frequently rendering it virtually conductive to produce shorts, "cross talks" and other undesirable effects.

Since electrical cable lines are very expensive to install and maintain, much has been done in an attempt to overcome the problem of moisture penetration. For example, the more important communications cable systems are often operated under constant gas pressure provided by nitrogen or other inert gas, which functions to prevent entry of moisture by continuous escape through the tiny cracks or holes developing in the cable sheathing. These gas systems must be constantly monitored and gas pressure alarm gauges installed at intervals to permit immediate location and repair of leaks. Even these gas systems, which are quite expensive, are not always effective. Thus, a break may be such that gas pressure is entirely lost, or the gas pressure might be ineffective at a distance from the pressure source to prevent entry of moisture during rain storms. Moreover, it is virtually impossible to effect removal of moisture accumulations from the low points of the cable since the gas just bubbles through the liquid without effecting its removal.

In general, the present invention is directed to what now seems a simple solution to the above problems, and has a general object the provision of a simple process by which electrical cable can be effectively protected from penetration by water, regardless of the conditions of operation.

A particular object of the present invention is to provide a process of treating electrical cable whereby conductor insulation and interior surfaces of the cable sheathing become coated and impregnated with a treating composition adapted to inhibiting penetration by water, (whether by action of insects, cracking of the sheath, electrolysis, etc.), and to prolonging the life of the cable components.

A further object of the invention is to provide electrical cable characterized by uniform high dielectric properties and enhanced resistance to moisture penetration, oxidation, weathering, and the like.

A still further object of the invention is to provide an improved treating composition for use in treating electrical cable to obtain the above described results.

Other objects and advantages of the invention will be apparent from the following description and the drawings in which:

FIGURE 2 is a like view illustrating a modified system for carrying out the process of the invention;

FIGURE 3 is a view in cross section of a typical overhead telephone cable, partially schematic, illustrating the practice of the present invention; and FIGURE 4 is an enlarged detail view, similar to FIGURE 3, further illustrating the invention.

Figure 1:
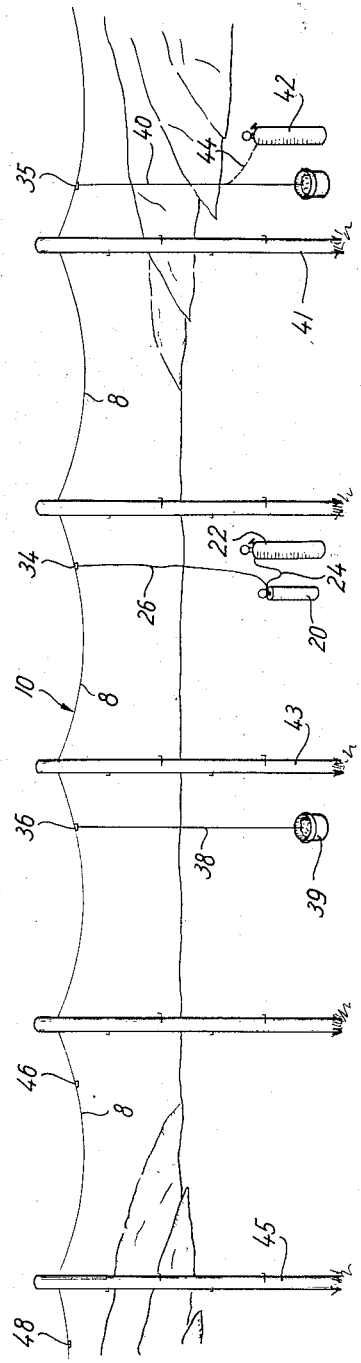
FIGURE 1 is a schematic view illustrating one system for carrying out the process of the invention.

In general, the present invention is directed to a process of treating electrical cable wherein a treating composition under pressure is employed to both physically expel intermixed moisture and air from the interior of cable, and also to apply a protective coating of the composition on the conductor insulation and interior surfaces of cable sheathing. In particular, I have found that a liquid mixture of varnish, silicone resin and a suitable solvent can be pumped under pressure through a section of electrical cable, even when the cable is in service, and thereafter be removed from the cable for reuse in treating additional sections of the cable. The treating composition thus serves not only to repeatedly remove accumulated moisture and water, but also by coating interior surfaces of the cable to greatly prolong the life of the cable and to prevent further penetration by moisture. I have also found that the effectiveness of my treating composition can be enhanced by inclusion of a small amount of an insecticide (e.g., pentachlorophenol), in the treating composition. The insecticide, coating the interior of the sheathing, acts to inhibit the action of boring insects, and thereby to prevent this source of cable penetration.

Referring to FIGURE 3, a typical telephone cable 10 consists of a plurality of insulated conductors 12 each of which is provided with suitable insulation 13 such as a paper or plastic covering. A protective covering or sheath 14 surrounds all the insulated conductors 12 and is formed of suitable material such as plastic, lead or lead alloys, steel tapes, and so on. When the outer sheath is constructed of non-metallic material such as plastic, it is customary to provide an additional layer 15 of sheathing material such as sheet aluminum around the insulated conductors 12, immediately adjacent the inner surface of the outer sheath.

The treatment of such cable in a conventional aerial system, for example, wherein a cable 10 is supported above the ground by poles, is illustrated in FIGURE 1. Under typical conditions of operation, it may be assumed that some moisture has penetrated the cable (through action of rain or snow), and has collected at low points in the cable system, represented at 8. In accordance with the present invention, a protective moisture resistant treating composition in pressure container 20 is forced through the interior of the cable 10 under a positive pressure induced by compressed air or nitrogen in the container 22. This can be accomplished by exerting sufficient pressure through the conduit 24 to force treating liquid upwardly through the conduit 26 to the interior of the cable. Normally, 10 to 20 pounds (gauge) of gas pressure on liquid in the container 20 is sufficient to force the treating composition through a substantial length of the cable.

As best illustrated in FIGURE 3, the liquid treating composition can be introduced to the interior of the cable by drilling a small opening in the cable sheathing and inserting the valve stem 28 of a check vale 30. Preferably the valve 30 is provided with a removable core 31, for example, as in the valve units conventionally employed in bicycle tires, and can form a permanent part of the cable system. Conduit 26 can be of plastic, rubber or other flexible construction adapted to fit over the end 32 of the valve to insure a gas tight connection with the container 20 of the treating fluid.

The effect of introducing the treating fluid to the interior of the cable is to force the fluid up into the air spaces of the cable, as generally indicated in FIGURE 3, and then lengthwise along the cable in either direction from the point of introduction at 34 (FIGURE 1). As the treating composition passes through the cable, it forces all the air, water, moisture and other fluid contaminants lengthwise of the cable until points of discharge are reached, as indicated at 35 and 36. The valve units at the discharge points can be prepared for this operation by removal of the core units 31, or in very cold weather, by removal of the entire valve unit 30, thereby insuring effective drainage.

Initially, the outflow from the discharge lines will be water, air and other contaminants. These contaminants can be discharged into the ground as they have no value. However, as soon as all the air, water and moisture are forced out through the discharge lines, the valve on the pressure container 22 can be closed and a second pressure container 42 connected into the system, as indicated at 44. A slightly higher gas pressure is employed for this operation, for example, 30 pounds (gauge), or higher. The effect is to cause the treating composition to flow back through the section of the line 10 between the poles 41 and 43 and out through the discharge line 38 into a suitable receptacle 39, for further use in the process. While this initial section of the cable is thus being drained, the pressure containers 20, 22 and line 26 can be disconnected from the cable line and moved into position for treating the next section of the cable line, for example, the section between poles 43 and 45, by being reconnected into the line at position 46. When the first section has drained, the process can be repeated for the new section by opening the valves to the pressure containers 20, 22, drainage through the original discharge line 38, and by moving the discharge line 40 to a new position 48. When water and contaminants have been expelled, pressure container 42 can be moved into position 36 to force the treating composition through the new section, as before. In this way a minimum crew (i.e., one or two men) can proceed along the cable line (to the left in FIGURE 1), effectively removing deposits of water and moisture and treating the interior of the cable with the treating composition.

FIGURE 2 indicates that the same general procedure can be utilized in treating underground cable (represented at 11). However, this figure particularly illustrates a technique that can be employed between relatively isolated points in the line, for example, up to ½ mile of more apart. In the illustration, separate pressure container systems 20, 22 are positioned on opposite sides of a canyon and connected into the overhead line, as at 50. While differential pressure might be employed to introduce treating composition from first one side and then from the other side, a preferred procedure is to insert fluid "blocks" or dams 52 within or through the cable at positions externally of the connections 50. The pressure systems 20, 22 can then be operated to simultaneously introduced treating composition from the remote points 49 towards a central discharge 47. In practice, water and contaminants, and subsequently treating fluid, are first discharged through the outlet 47, following which the connecting lines 54 can be disconnected from the treatment tanks 20 for direct connection to the pressure tanks 22, to permit recovery of the treating fluid.

It will be understood that the procedure of FIGURE 2 can be easily carried out by a two-man team, particularly in lines where the "blocks" or dams 52 have been installed at regular intervals (e.g., every ½ mile) as a permanent part of the cable line. This technique and the procedure described previously in connection with FIGURE 1, are only illustrative of various operating procedures and techniques that can be employed both in aerial and underground systems. Obviously many possible variations are within the scope of the invention.

Referring to FIGURE 4, the ultimate effect of treatment in accordance with the invention is to coat the interior surfaces of the cable sheathing and the conductor insulation with a thin film 60 of treating composition. Under effective operating pressures, the treating composition also tends to fill minor imperfections, cracks, holes, etc. in the cable sheathing, as generally indicated at 62. We have found that best results are obtained at operating pressures within the range from about 5 to 30 p.s.i.g., and that up to 300 feet or more of aerial cable can be effectively treated at such pressures, at each operation. Even longer sections of cable can, of course, be treated at higher operating pressures, but the higher pressures tend to create some problems in existing cable line systems. In underground cable, this range of pressure permits effective treatment of cable in lengths in excess of 500 feet—ranging up to 1600 feet or longer, under proper conditions.

The coating process of the present invention is easily accomplished since the cable is entirely filled with treating composition during the treating operation. After draining, the volume of the treating composition remaining as a deposit on the interior of the sheathing and conductor insulation is generally about 4 to 22% of the total volume of the composition passing through the cable, depending upon the size of the sheathing, size and type of conductor, and thickness of insulation or dielectric surroundings of the conductors. This proportion of treating composition has a highly beneficial effect on the cable itself, making it more waterproof, increasing its flexibility and effective life, and rendering it virtually resistant to the atmosphere. In addition, castings, splices or other defects in the cable can be sprayed with the treating composition, also switchboards, terminals, junction boxes, and the like, to increase the protection to the cable line. These and other advantages are possible as a result of the unique characteristics of our new treating composition, as will hereinafter be explained.

A preferred treating composition for use in carrying out the invention comprises a free-flowing liquid mixture of a varnish, silicone resin and a suitable solvent. It should be immiscible with water and chemically inert with respect to the dielectric material of the conductor, and the material of the cable sheath. Preferably, my treating composition should also have a fluid viscosity of about 0.5 to 50 centipoises within an operating temperature range of about 0° to 90° F., to insure necessary fluidity within the restricted interior passages of the cable.

When the cable lines are to be used in areas of expected infestation by boring insects, such as termites (e.g., in underground installations, etc.) it is desirable that an additional quantity of an insecticide be added, for example, pentachlorophenol, benzene-hexachloride (BHC) parathion, chlorodan, and similar insecticides. In general, pentachlorophenol is preferred because of its low cost and effectiveness against termites.

The term "varnish" used herein refers to any colloidal dispersion or solution of a synthetic or natural resin in a solvent, and which is capable of forming and polymerizing as a coating on the interior of the cable and conductor insulation. Varnishes useful in carrying out the present invention include those based on natural resins, such as shellac, rosin, copal, dammar, and the like, as well as those based on the synthetic resins such as the acrylates, alkyds, and vinyl resins, dispersed in a suitable solvent, such as a petroleum distillate. Varnishes found to be particularly useful in carrying out the invention comprise the unsaturated polyesters produced by reacting unsaturated acids such as fumaric, maleic, azelaic, chlorendic acids and their anhydrides with polyhydric alcohol, and dispersing the reaction product in a suitable solvent. Thus, a preferred composition comprises a solution of approximately 60% of the reaction product of fumaric acid with diethylene glycol dispersed in an excess of diethylene glycol. A particularly satisfactory varnish composition of this general type is VCS 107, manufactured by the Sherwin Williams Co. of Cleveland, Ohio.

The term "silicone resin" as used herein refers to the group of resinous products produced by the condensation of organosilicon halide intermediates made by any of the various methods, including the direct process, the Grignard method, and the Owens method. Thus, modified silicone resins can be prepared by reacting a silicone intermediate with an organic compound containing more than one hydroxyl group and then reacting the final product with fatty acids or phthalic anhydride to give alkyd-type polymers containing siloxane groupings. For example, one satisfactory group of silicone resins is prepared by treatment of Grignard reagents with silicone tetrachloride, and then hydrolyzing the resulting organic silicon chlorides. They are essentially polymers of

in which R and R' may be either alkyl or aryl radicals. Structurally, organo polysiloxanes of this type polymerize to form linear chains and cross linked products, the degree of cross linking determining, to a large extent, the physical form of the finished silicone resin. Commercial silicone resins are mainly straight-chain dimethyl siloxanes that are vulcanized with peroxides, but may also be based on trimer intermediates.

A particularly satisfactory group of silicone resins for use in the present invention comprises liquid resins based on trimer intermediates, having the following general form,

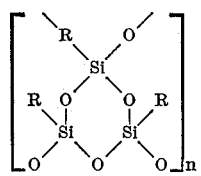

fhere R is again an alkyl or aryl radical. A preferred resin is in the form of a partially polymerized trimethyl siloxane. Metal catalysts are advantageously employed in producing these resins. It is believed that the silicone resins produced in this fashion are cross linked to a metal oxygen bond. Accordingly, suitable metal catalysts to effect this linkage can be picked from the transition metal series, those favorable as driers being the most effective (e.g., cobalt, manganese, lead, zinc, etc.). One trimethyl siloxane composition found to be particularly useful in the present invention is Silicone S40 (manufactured by Anderson Labs, Anderson, Wisconsin), this resin employing about 2% white lead in the condensation reaction, and 1% cobalt as a drier.

The solvents perform the function, principally, of providing the desired homogeneous mixture of the varnish and silicone resin, and viscosity control. The particular solvent employed will, of course, depend upon the type varnish and silicone resin making up the essential components of the treating composition. Where the treating composition comprises a varnish based on an unsaturated polyester (e.g., derived from fumaric acid) and a silicone resin of the type indicated above (e.g., based on a trimer intermediate), I have found that ethyl acetate is a particularly effective solvent. Other solvents include the napthas, dipentene, xylol, toluol, turpentine, and alcohol, depending on the particular varnish-resin-solvent system.

In general, and assuming that the treating composition is formulated from varnish (i.e., XCS 107, Sherwin Williams Co.), a silicone resin (i.e., Silicone S40, Anderson Labs), and a solvent (i.e., ethyl acetate), the proportions may range as follows:

Table

| Ingredient: | Weight percent |
|---|---|
| Varnish | 5–10 |
| Silicone resin | 10–20 |
| Solvent | 65–85 |

Where an insecticide, such as pentachlorophenol, is added to the composition, it is generally effective in amounts ranging from about 0.5 to 5% of the total weight of the formulation.

The foregoing general range of ingredients is specified to make clear that the invention is not limited to certain of the ingredients, or to a specific proportioning of ingredients.

From the above description, it will be apparent that the process and treating composition of the present invention makes possible the treating of all types of electrical cable, even while such cable is in service, to render the cable highly resistant to malfunctioning or breakdown due to the presence of moisture. Specifically, my new treating composition functions by being pushed through the cable at relatively low operating pressures, to both remove existing accumulations of water and to inhibit further penetrations by water due to the action of insects, cracking of the sheathing, electrolysis, and so on. My treatment is also relatively permanent since the composition is at all times shielded by the outer sheath of the cable, preventing deterioration due to repeated exposure to the elements (e.g., ultraviolet rays, ozone, etc.). My composition and process have proved particularly effective in restoring lines which have been penetrated or breached as the result of prior infestation by insects, deterioration by electrolysis, etc., since the composition functions during the processing to fill and seal all existing cracks and holes in the cable sheathing. Cables treated by my process are also highly resistant to temperature change, present no fire hazard, and have the further advantage in use (i.e., during repairs) of permitting easy separation of pairs of conductors and removal of insulation. These and other advantages of my treating composition and process provide electrical cable which is not only characterized by high uniform dielectric properties but an enhanced resistance to oxidation and weathering not capable of being obtained in prior cable systems.

To those skilled in the art to which this invention relates, many additional advantages as well as widely differing applications and embodiments of the invention will suggest themselves without departing from the spirit and scope of the invention. For example, it is contemplated that for certain purposes a normally solid wax might be substituted for part or all of the varnish component by a procedure involving heating the intermixed wax and treating composition to the boiling point of the mixture, to thereby incorporate the wax into the liquid mixture, and then allowing the mixture to cool. This procedure permits the melted wax to remain in solution so that the treating composition thus produced can be used in the manner generally described above. Suitable waxes for this purpose include the conventional high temperature waxes (e.g. synthetic waxes, M.P. about 205–212° F.), various vegetable and mineral waxes (e.g. paraffin waxes, M.P. about 125–135° F.), commercial microcrystalline waxes or mixtures of these waxes. Preferably, the wax or mixture of waxes employed in carrying out the invention should have a melting point within the range from about 150 to 190° F., to avoid either excessive softness or brittleness of the wax. These and other variations are clearly within the general concept of the invention, it being understood that this disclosure and the description herein are purely illustrative and not intended to be in any sense limiting.

I claim:
1. In a process of treating electrical cable to inhibit penetration by water and boring insects, and to prolong life, the steps of introducing a treatment composition under pressure to the interior of said cable, said treating composition comprising from 5 to 10% of an unsaturated polyester resin varnish, 10 to 20% of a partially polymerized silicone resin, 0.5 to 5% of an insecticide composition, and 65 to 85% of a solvent, and withdrawing said treating composition from the cable at a point remote from the point of introduction, whereby the conductor insulation and the interior surfaces of the cable sheathing between said points of introduction and withdrawal become coated and impregnated with said treating composition.

2. A process as in claim 1 wherein said insecticide composition is pentachlorophenol.

3. A process as in claim 1 wherein said treating composition is introduced while said electrical cable is in service.

References Cited by the Examiner

UNITED STATES PATENTS

| | | | |
|---|---|---|---|
| 1,774,292 | 8/1930 | Reed | 156—48 |
| 1,815,706 | 7/1931 | Del Mar | 156—48 |
| 2,115,574 | 4/1938 | Gasser | 156—48 |
| 2,222,638 | 11/1940 | Szilard | 174—116 |
| 2,792,441 | 5/1957 | Platow | 156—48 XR |
| 2,800,524 | 7/1957 | Van Lear | 174—116 |
| 2,981,983 | 5/1961 | Moretz | 156—48 XR |

FOREIGN PATENTS 403,616   3/1932   Great Britain.

EARL M. BERGERT, *Primary Examiner.*

JOHN P. WILDMAN, *Examiner.*

W. F. ZAGURSKI, P. R. WYLIE, J. F. MATHEWS,
*Assistant Examiners.*